United States Patent [19]
Steidle

[11] Patent Number: 6,003,688
[45] Date of Patent: Dec. 21, 1999

[54] LID RESTING DEVICE

[76] Inventor: Robert Steidle, 230 Savannah Rd. Lot #1, Fort Pierce, Fla. 34982

[21] Appl. No.: 09/057,771

[22] Filed: Apr. 9, 1998

[51] Int. Cl.$^6$ .............................. A47G 19/08; A47H 1/00
[52] U.S. Cl. ........................................... 211/41.11; 211/96
[58] Field of Search .................. 211/41.11, 104, 211/96; 248/291.1, 240

[56] References Cited

U.S. PATENT DOCUMENTS

| | | |
|---|---|---|
| 2,165,654 | 7/1939 | Rosenthal . |
| 2,662,717 | 12/1953 | Johnson . |
| 2,987,193 | 6/1961 | Pajor . |
| 3,270,993 | 9/1966 | Montague ..................... 248/291.1 X |
| 4,790,503 | 12/1988 | Pohler . |
| 5,038,945 | 8/1991 | Melkonian . |
| 5,396,993 | 3/1995 | Spitler . |

*Primary Examiner*—Daniel P. Stodola
*Assistant Examiner*—Erica B. Harris

[57] ABSTRACT

A new lid resting device for resting lids thereon, in particular, pot and pan lids. The device includes a base plate and at least one resting member mounted to the front surface of the base plate. The resting member includes a pair of elongate arms. A cross member is extended between the arms. The arms are pivotally coupled to the front surface of the base plate so that the arms are pivotable between a raised position and a lowered position. In the raised position, the lengths of the arms are generally parallel with the front surface of the base plate. When the arms are in the lowered position, the lengths of the arms are generally perpendicular to the front surface of the base plate.

8 Claims, 3 Drawing Sheets

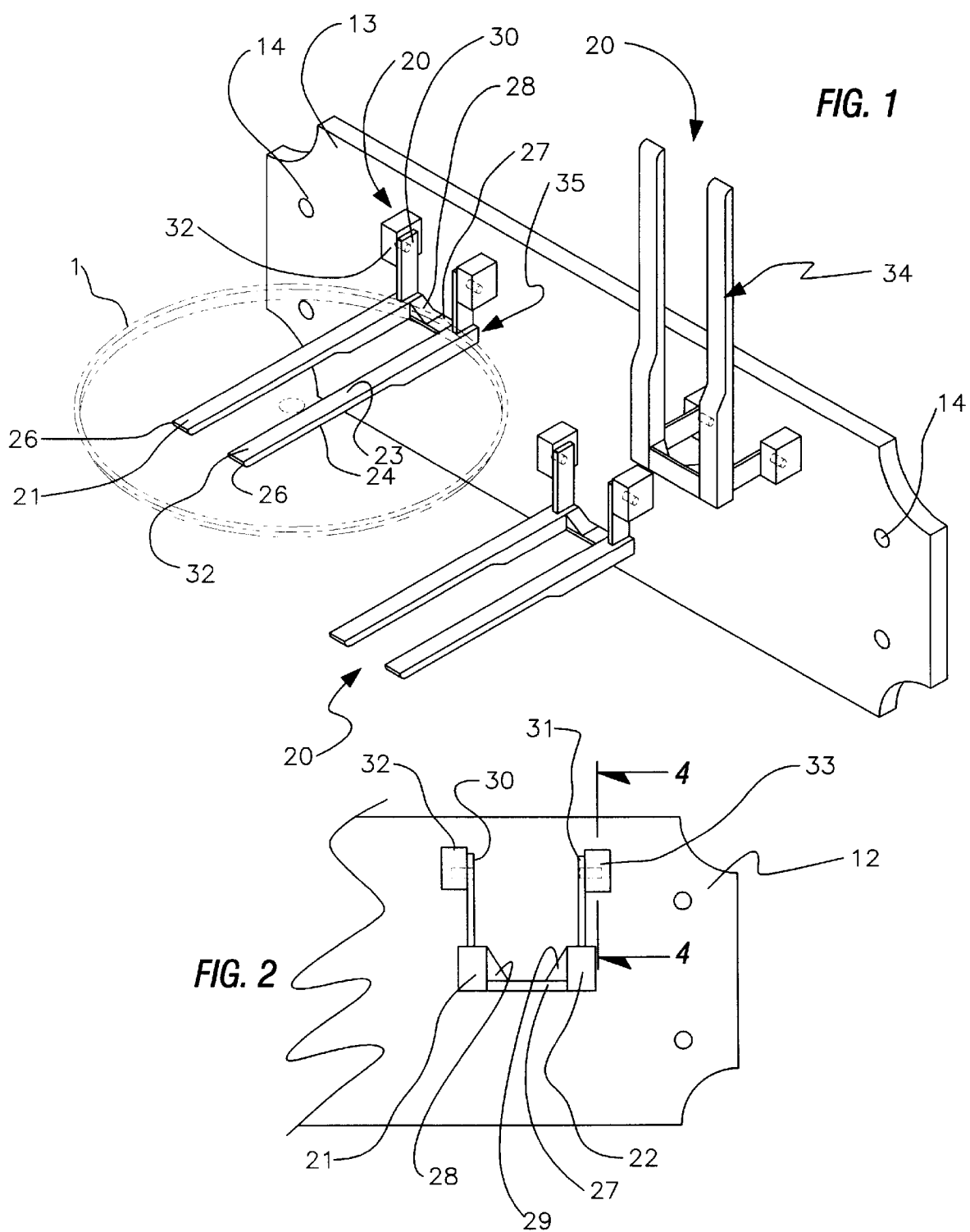

LID RESTING DEVICE

BACKGROUND OF THE INVENTION

1. Field of the Invention

The present invention relates to devices for resting lids on and more particularly pertains to a new lid resting device for resting lids thereon, in particular, pot and pan lids.

2. Description of the Prior Art

The use of devices for resting lids on is known in the prior art. More specifically, devices for resting lids on heretofore devised and utilized are known to consist basically of familiar, expected and obvious structural configurations, notwithstanding the myriad of designs encompassed by the crowded prior art which have been developed for the fulfillment of countless objectives and requirements.

Known prior art devices for resting lids on include U.S. Pat. No. 5,038,945; U.S. Pat. No. 4,790,503; PCT Pat. No. WO 92/04848 (inventor: Carney); PCT Pat. No. WO 91/01107 (inventor: Meneghello); U.S. Pat. No. 5,396,993; U.S. Pat. No. 2,165,654; and U.S. Pat. No. 2,987,193.

While these devices fulfill their respective, particular objectives and requirements, the aforementioned patents do not disclose a new lid resting device. The inventive device includes a base plate and at least one resting member mounted to the front surface of the base plate. The resting member includes a pair of elongate arms. A cross member is extended between the arms. The arms are pivotally coupled to the front surface of the base plate so that the arms are pivotable between a raised position and a lowered position. In the raised position, the lengths of the arms are generally parallel with the front surface of the base plate. When the arms are in the lowered position, the lengths of the arms are generally perpendicular to the front surface of the base plate.

In these respects, the lid resting device according to the present invention substantially departs from the conventional concepts and designs of the prior art, and in so doing provides an apparatus primarily developed for the purpose of resting lids thereon, in particular, pot and pan lids.

SUMMARY OF THE INVENTION

In view of the foregoing disadvantages inherent in the known types of devices for resting lids on now present in the prior art, the present invention provides a new lid resting device construction wherein the same can be utilized for resting lids thereon, in particular, pot and pan lids.

The general purpose of the present invention, which will be described subsequently in greater detail, is to provide a new lid resting device apparatus and method which has many of the advantages of the devices for resting lids on mentioned heretofore and many novel features that result in a new lid resting device which is not anticipated, rendered obvious, suggested, or even implied by any of the prior art devices for resting lids on, either alone or in any combination thereof.

To attain this, the present invention generally comprises a base plate and at least one resting member mounted to the front surface of the base plate. The resting member includes a pair of elongate arms. A cross member is extended between the arms. The arms are pivotally coupled to the front surface of the base plate so that the arms are pivotable between a raised position and a lowered position. In the raised position, the lengths of the arms are generally parallel with the front surface of the base plate. When the arms are in the lowered position, the lengths of the arms are generally perpendicular to the front surface of the base plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new lid resting device apparatus and method which has many of the advantages of the devices for resting lids on mentioned heretofore and many novel features that result in a new lid resting device which is not anticipated, rendered obvious, suggested, or even implied by any of the prior art devices for resting lids on, either alone or in any combination thereof.

It is another object of the present invention to provide a new lid resting device which may be easily and efficiently manufactured and marketed.

It is a further object of the present invention to provide a new lid resting device which is of a durable and reliable construction.

An even further object of the present invention is to provide a new lid resting device which is susceptible of a low cost of manufacture with regard to both materials and labor, and which accordingly is then susceptible of low prices of sale to the consuming public, thereby making such lid resting device economically available to the buying public.

Still yet another object of the present invention is to provide a new lid resting device which provides in the apparatuses and methods of the prior art some of the advantages thereof, while simultaneously overcoming some of the disadvantages normally associated therewith.

Still another object of the present invention is to provide a new lid resting device for resting lids thereon, in particular, pot and pan lids.

Yet another object of the present invention is to provide a new lid resting device which includes a base plate and at least one resting member mounted to the front surface of the base plate. The resting member includes a pair of elongate arms. A cross member is extended between the arms. The arms are pivotally coupled to the front surface of the base plate so that the arms are pivotable between a raised position and a lowered position. In the raised position, the lengths of the arms are generally parallel with the front surface of the base plate. When the arms are in the lowered position, the lengths of the arms are generally perpendicular to the front surface of the base plate.

Still yet another object of the present invention is to provide a new lid resting device that provides a convenient stand for resting lids on when cooking.

Even still another object of the present invention is to provide a new lid resting device that provides a place to rest lid on to let them cool off after removing them from a heated pot or pan.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new lid resting device according to the present invention.

FIG. 2 is a schematic partial front side view of the present invention.

DESCRIPTION OF THE PREFERRED EMBODIMENT

Figure 3:
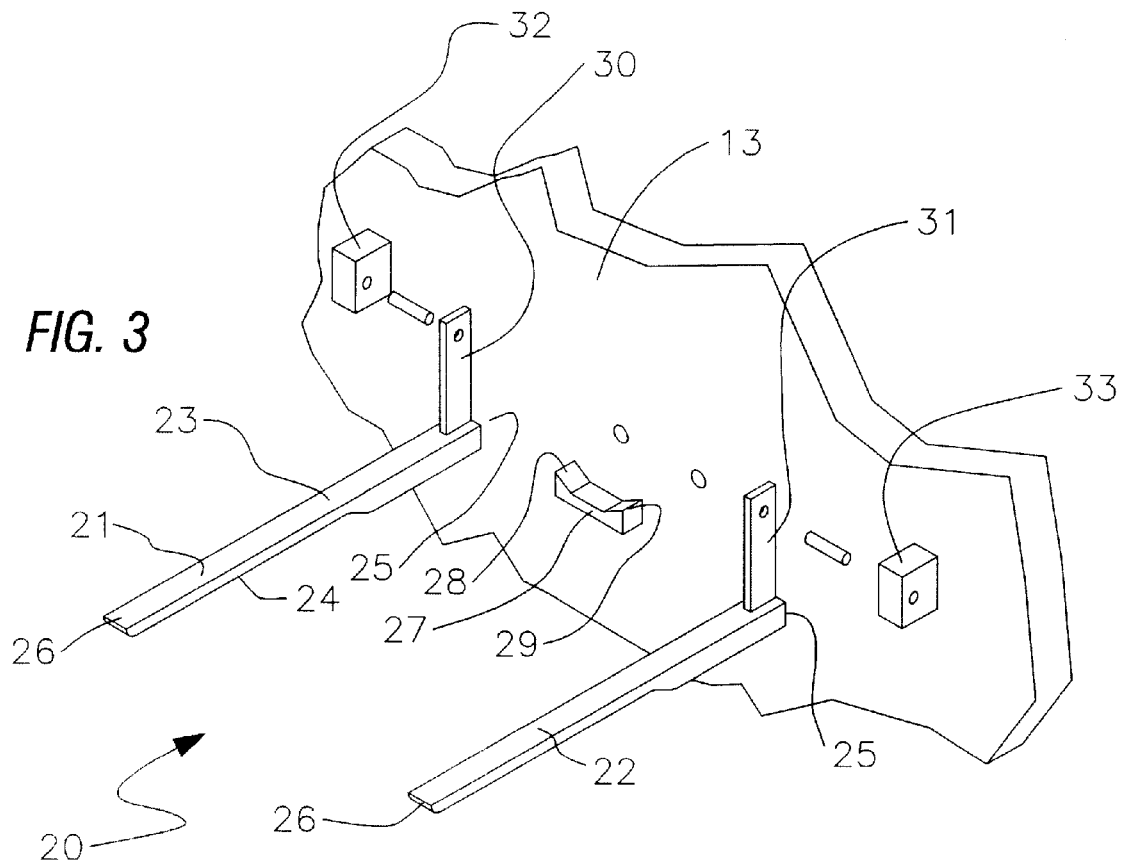
FIG. 3 is a schematic partial exploded view of a resting member of the present invention.
Figure 4:
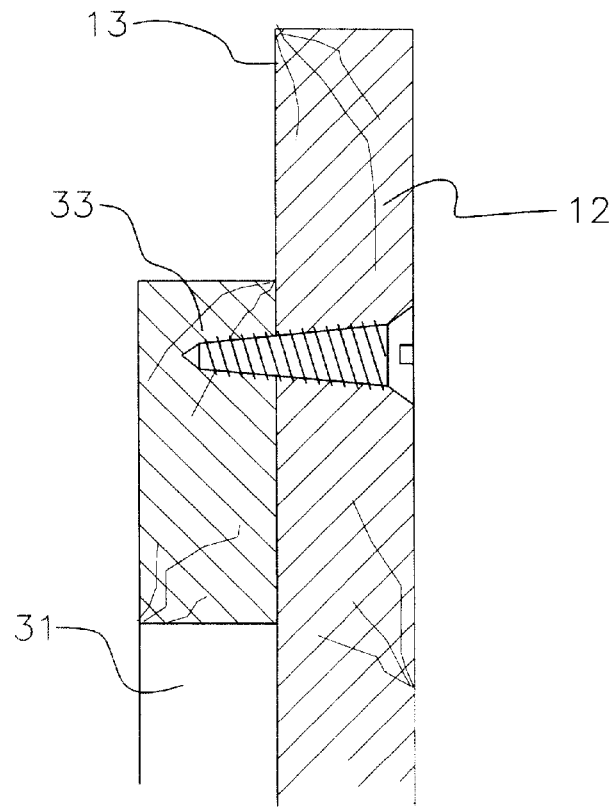
FIG. 4 is a schematic sectional view of the present invention taken from line 4—4 on FIG. 2.
Figure 5:
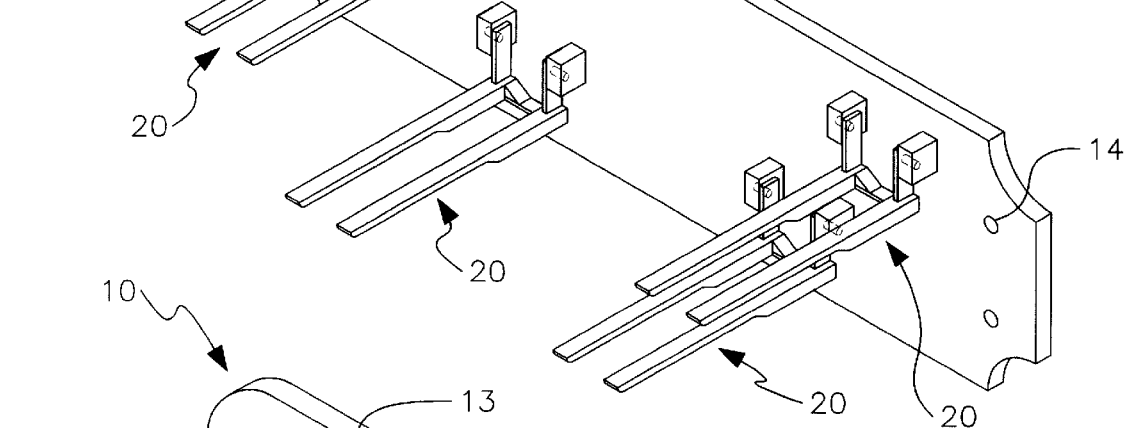
FIG. 5 is a schematic perspective view of an optional embodiment of the present invention having four resting members.
Figure 6:
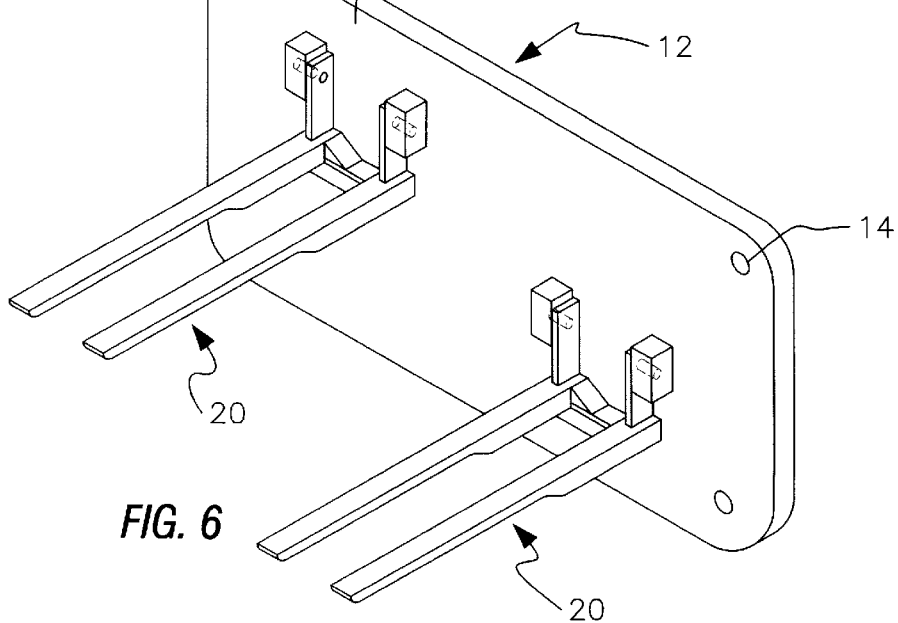
FIG. 6 is a schematic perspective view of another optional embodiment of the present invention.

With reference now to the drawings, and in particular to FIGS. 1 through 6 thereof, a new lid resting device embodying the principles and concepts of the present invention and generally designated by the reference numeral 10 will be described.

As best illustrated in FIGS. 1 through 6, the lid resting device 10 generally comprises a base plate 12 and at least one resting member 20 mounted to the front surface 13 of the base plate 12. The resting member 20 includes a pair of elongate arms 21,22. A cross member 27 is extended between the arms 21,22. The arms 21,22 are pivotally coupled to the front surface 13 of the base plate 12 so that the arms 21,22 are pivotable between a raised position 34 and a lowered position 35. In the raised position 34, the lengths of the arms 21,22 are generally parallel with the front surface 13 of the base plate 12. When the arms 21,22 are in the lowered position 35, the lengths of the arms 21,22 are generally perpendicular to the front surface 13 of the base plate 12.

In use as illustrated in FIG. 1, the device 10 is designed for holding pot and pan lids 1 thereon. In closer detail, the base plate 12 has a substantially planar front surface 13 and is adapted for attachment to a wall structure. Preferably, the base plate 12 has a plurality of holes 14 therethrough for inserting fasteners through to attaching the base plate 12 to the wall structure. In an illustrative ideal embodiment, the base plate 12 has a length of less than about 30 inches, and a width of less than about 6 inches.

At least one resting member 20 is mounted to the front surface 13 of the base plate 12. Each resting member 20 includes a pair of elongate arms 21,22 each having top and bottom surfaces 23,24, opposite proximal and distal ends 25,26, and a length between the proximal and distal ends. Preferably, a portion of the bottom surface 24 of each arm adjacent the distal end 26 is tapered towards the top surface 23. The arms 21,22 are spaced apart from each other preferably with the lengths of the arms 21,22 substantially parallel with one another. A cross member 27 extends between the arms 21,22 to connect the arms 21,22 together. The cross member 27 is preferably positioned adjacent the proximal ends 25 of the arms 21,22. Preferably, the cross member 27 has a pair of generally triangular side braces 28,29. One of the side braces 28 is positioned adjacent one of the arms 21 while the other side brace 29 is positioned adjacent the other arm 22.

Each of the arms 21,22 has a stem 30,31 extending from the top surface 23 of the arm. The stems 30,31 are positioned adjacent the proximal end 25 of their arm. Preferably, the lengths of the stems 30,31 are substantially parallel to each other while each of the stems 30,31 is substantially perpendicular to the length of the their associated arm. A pair of spaced apart mounting blocks 32,33 are also provided for each resting member 20. Ideally, the mounting blocks 32,33 are spaced apart about 2 inches, for example: 17/8 inches. The mounting blocks 32,33 are coupled to the base plate 12 by fasteners. Each of the mounting blocks 32,33 is pivotally coupled to an associated stem 30,31 so that one of the mounting blocks 32 is pivotally coupled to one of the stems 30 and the mounting block 33 is pivotally coupled to the other stem 31.

As illustrated in FIG. 1, the arms 21,22 are pivotable between a raised position 34 and a lowered position 35. Preferably, the lengths of the arms 21,22 are generally parallel with the front surface 13 of the base plate 12 when the arms 21,22 are in the raised position 34 with the distal ends 26 of the arms 21,22 positioned above the proximal ends 25 of the arms 21,22. Preferably, the lengths of the arms 21,22 are generally perpendicular to the front surface 13 of the base plate 12 when the arms 21,22 are in the lowered position 35.

In use, the top surfaces 23 of the arms 21,22 are designed for resting a lid 1 thereon when the arms 21,22 are in the lowered position 35. Ideally, a top handle provided on the lid is inserted in the space between the arms 21,22. When not used to hold lids 1, the arms 21,22 may be pivoted into the raised position so that they do not extend too far out from the base plate.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for holding lids thereon, said device comprising:
   a base plate having a front surface, said base plate being adapted for attachment to a structure; and
   at least one resting member mounted to said front surface of said base plate, said resting member comprising:
      a pair of elongate arms each having top and bottom surfaces, opposite proximal and distal ends, a length between said proximal and distal ends;
      said arms being spaced apart from each other;
      a cross member being extended between said arms;
      each of said arms having a stem being upwardly extended from said top surface of said arm at a fixed angle, said stems being positioned adjacent the proximal end of the associated arm;
      said stems being pivotally coupled to said front surface of said base plate such that said stems and said arms are pivotable between a raised position and a lowered position relative to said base plate, wherein said lengths of said arms are generally parallel with said front surface of said base plate when said arms are in said raised position, wherein the lengths of said arms are generally perpendicular to said front surface of said base plate when said arms are in said lowered position.

2. The device of claim 1, wherein a portion of said bottom surface of each arm adjacent said distal end of the associated arm is tapered towards said top surface of the associated arm.

3. The device of claim 1, wherein said lengths of said arms are substantially parallel with one another.

4. The device of claim 1, wherein said cross member is positioned adjacent said proximal ends of said arms.

5. The device of claim 1, wherein said cross member has a pair of side braces, one of said side braces being positioned adjacent one of said arms, another of said side braces being positioned adjacent another of said arms.

6. The device of claim 1, further comprising a pair of spaced apart mounting blocks, said mounting blocks being coupled to said base plate, wherein one of said mounting blocks is pivotally coupled to one of said stems, another of said mounting blocks is pivotally coupled to another of said stems such that said arms are pivotable between said raised and lowered positions.

7. The device of claim 6, wherein said stems are substantially parallel to each other, and wherein each of said stems is fixedly positioned to extend away from the associated arm substantially perpendicular to the length of the associated arm.

8. A device for holding lids thereon, said device comprising:
   a base plate having a front surface, said base plate being adapted for attachment to a structure; and
   at least one resting member mounted to said front surface of said base plate, said resting member comprising:
      a pair of elongate arms each having top and bottom surfaces, opposite proximal and distal ends, a length between said proximal and distal ends;
      a portion of said bottom surface of each arm adjacent said distal end of the associated arm being tapered towards said top surface of the associated arm;
      said arms being spaced apart from each other, said lengths of said arms being substantially parallel with one another;
      a cross member being extended between said arms, said cross member being positioned adjacent said proximal ends of said arms;
      said cross member having a pair of side braces, each of said side braces being generally triangular, one of said side braces being positioned adjacent one of said arms, another of said side braces being positioned adjacent another of said arms;
      each of said arms having a stem being upwardly extended from said top surface of said arm at a fixed angle, said stems being positioned adjacent the proximal end of the associated arm;
      said stems being substantially parallel to each other, each of said stems being substantially perpendicular to the length of the associated arm;
      a pair of spaced apart mounting blocks, said mounting blocks being coupled to said base plate, one of said mounting blocks being pivotally coupled to one of said stems, another of said mounting blocks being pivotally coupled another of said stems; and
      said arms being pivotable between a raised position and a lowered position, wherein said lengths of said arms are generally parallel with said front surface of said base plate when said arms are in said raised position, wherein the lengths of said arms are generally perpendicular to said front surface of said base plate when said arms are in said lowered position.

* * * * *